US010943002B2

(12) United States Patent
Yamada (10) Patent No.: US 10,943,002 B2
(45) Date of Patent: Mar. 9, 2021

(54) PASSWORD AUTHENTICATING APPARATUS FOR EXECUTING USER AUTHENTICATION USING PASSWORD (71) Applicant: KYOCERA Document Solutions Inc., Osaka (JP)

(72) Inventor: Yohei Yamada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 280 days.

(21) Appl. No.: 16/265,711

(22) Filed: Feb. 1, 2019

(65) Prior Publication Data
US 2019/0236262 A1 Aug. 1, 2019

(30) Foreign Application Priority Data

Feb. 1, 2018 (JP) .............................. JP2018-016324

(51) Int. Cl.
G06F 21/00 (2013.01)
G06F 21/36 (2013.01)
(Continued)

(52) U.S. Cl.
CPC .............. *G06F 21/36* (2013.01); *G06F 21/31* (2013.01); *G06F 21/45* (2013.01)

(58) Field of Classification Search
CPC .......... G06F 21/36; G06F 21/31; G06F 21/45; H04N 1/4413; H04N 1/00408; H04N 2201/0094
See application file for complete search history.

(56) References Cited

U.S. PATENT DOCUMENTS 9,722,996 B1* 8/2017 Kolman ................ H04L 63/083
2007/0022299 A1* 1/2007 Yoshimura .............. G06F 21/31
713/183

(Continued)

FOREIGN PATENT DOCUMENTS

CN 1725143 A 1/2006
JP H06-177872 A 6/1994
JP 2016-024529 A 2/2016

OTHER PUBLICATIONS

China National Intellectual Property Administration. Office Action of foreign counterpart dated Sep. 2, 2020.

*Primary Examiner* — Brandon S Hoffman
*Assistant Examiner* — William A Corum, Jr.
(74) *Attorney, Agent, or Firm* — Hawaii Patent Services; Nathaniel K. Fedde; Kenton N. Fedde (57) ABSTRACT Provided is a password authenticating apparatus that can provide a hint for selecting a password without displaying a part of the password. The input-receiving unit receives input of a password as an input password. A password-header-comparing unit compares a header portion of the input password up to a number of header comparison characters with authentication information, and determines whether or not the header portion of the input password up to the number of header comparison characters matches a portion from the start of a registered password up to the number of header comparison characters. A screen-generating unit, when it is determined there is no match, generates a header-error screen providing guidance that the input password already does not match in the header portion as a display screen. A display-control unit causes a display unit to display the display screen generated by the screen-generating unit.

8 Claims, 6 Drawing Sheets (51) Int. Cl.
*G06F 21/45* (2013.01)
*G06F 21/31* (2013.01)

(56) References Cited

U.S. PATENT DOCUMENTS

| | | | | |
|---|---|---|---|---|
| 2012/0304302 | A1* | 11/2012 | Stecher | G06F 21/84 726/26 |
| 2014/0068757 | A1* | 3/2014 | Komatsu | H04L 63/083 726/19 |
| 2014/0146054 | A1* | 5/2014 | Luan | G06F 21/31 345/467 |
| 2016/0065713 | A1* | 3/2016 | Yang | G06F 3/0488 455/411 |
| 2016/0149895 | A1* | 5/2016 | Takai | G06F 21/608 726/7 |
| 2016/0162680 | A1* | 6/2016 | Chen | G06F 21/31 726/19 |
| 2018/0054310 | A1* | 2/2018 | Shimizu | H04L 9/3226 |
| 2018/0114003 | A1* | 4/2018 | Uenishi | G06F 3/04883 |
| 2019/0189133 | A1* | 6/2019 | Bae | G10L 17/02 |

* cited by examiner

FIG.4

PASSWORD AUTHENTICATING APPARATUS FOR EXECUTING USER AUTHENTICATION USING PASSWORD

INCORPORATION BY REFERENCE

This application is based on and claims the benefit of priority from Japanese Patent Application No. 2018-016324 filed on Feb. 1, 2018, the contents of which are hereby incorporated by reference.

BACKGROUND

The present disclosure relates to a password authenticating apparatus for executing user authentication using a password.

An image forming apparatus such as a copying machine, a printer, a multifunction peripheral and the like, an information processing apparatus such as a computer and the like, and various services on a network, are mounted with a user authenticating function that uses a password. Generally, users often use a plurality of passwords differently. Therefore, when entering a password, there are cases where a user may forget which password is set.

Therefore, as a typical technique, there is a technique of displaying a part of a password as a hint when a password is forgotten.

SUMMARY

The password authenticating apparatus according to the present disclosure is a password authenticating apparatus that executes user authentication using a password. The password authenticating apparatus includes a storage unit, an input-receiving unit, a password-header-comparing unit, a screen-generating unit, and a display-control unit. The storage unit stores authentication information in which a password is registered as a registered password. The input-receiving unit receives input of a password as an input password. The password-header-comparing unit, when input of a preset number of header comparison characters is received by the input-receiving unit, compares a header portion of the input password up to the number of header comparison characters with authentication information, and determines whether or not the header portion of the input password up to the number of header comparison characters matches a portion from the start of the registered password up to the number of header comparison characters. The screen-generating unit, in the case where the password-header-comparing unit determines that there is no match, generates a header-error screen that provides guidance that the header portion of the input password is already incorrect as a display screen. The display-control unit causes a display unit to display the display screen that is generated by the screen-generating unit. Furthermore, the input-receiving unit, in the case where the password-header-comparing unit determines there is a match, receives continuing input of the input password.

The password authenticating apparatus according to the present disclosure is a password authenticating apparatus that executes user authentication using a password. The password authenticating apparatus includes a storage unit, an input-receiving unit, an entire-password-comparing unit, an authorizing unit, a screen-generating unit and a display-control unit. The storage unit stores authentication information in which a password is registered as a registered password. The input-receiving unit receives input of a password as an input password. The entire-password-comparing unit, after receiving the input of the input password by the input-receiving unit is completed, compares the input password with the authentication information, and together with determining whether or not the input password matches the registered password, determines whether or not the input password nearly matches the registered password. The authorizing unit, in the case where the entire-password-comparing unit determines that there is a match, executes a login process. The screen-generating unit, in the case where the entire-password-comparing unit determines that there is a near match, generates a similarity-error screen providing guidance that the input password and the registered password do not match but are rather close as a display screen, and in the case where the entire-password-comparing unit determines that there is no near match, generates a difference-error screen providing guidance that the input password and the registered password do not match at all as a display screen. The display-control unit causes a display unit to display the display screen that is generated by the screen-generating unit.

DETAILED DESCRIPTION

In the following, embodiments according to the present disclosure will be described in detail with reference to the drawings. Incidentally, in the following embodiments, the same reference numerals are given to configurations showing similar functions.

Figure 1:
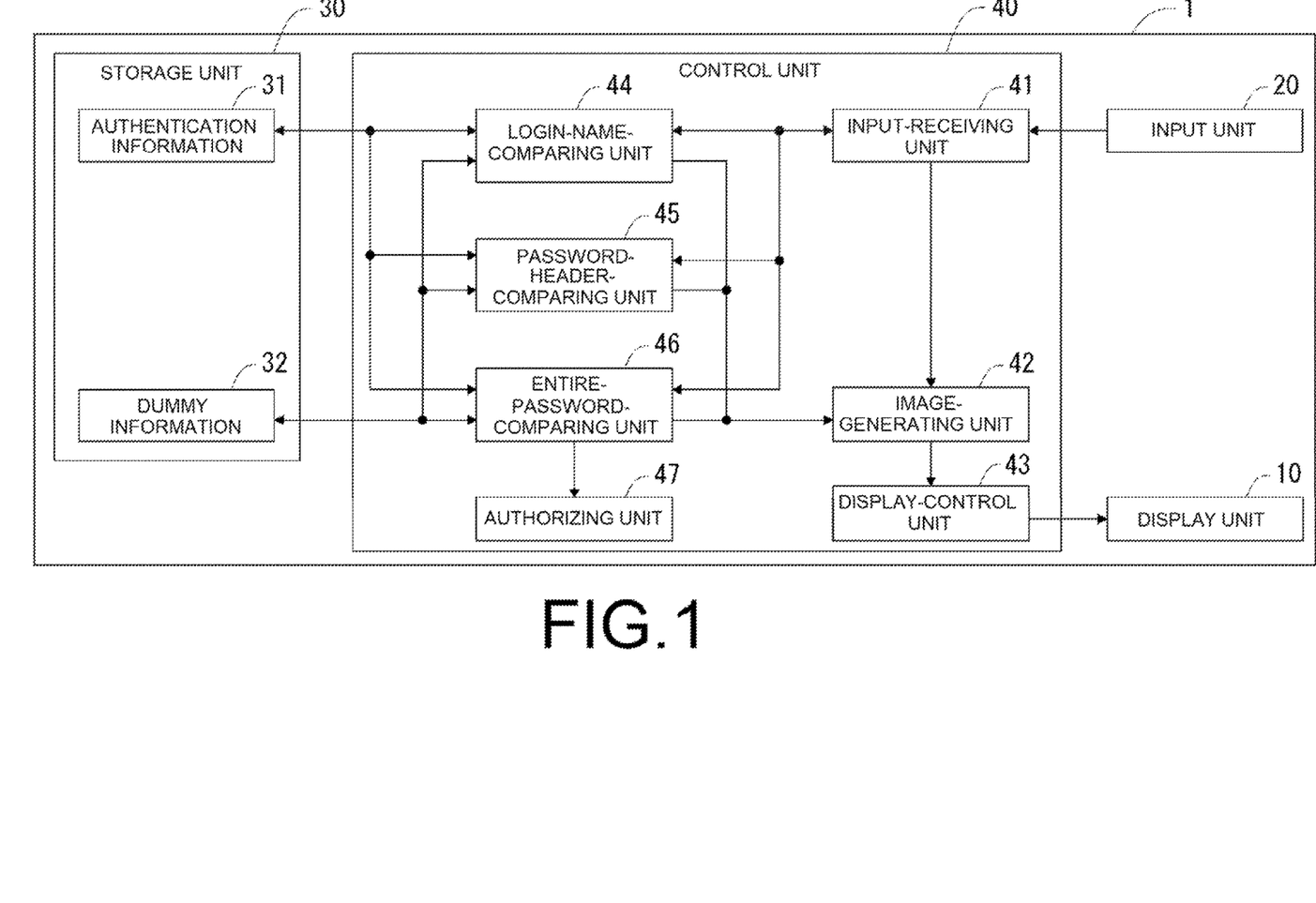
FIG. 1 is a block diagram illustrating a schematic configuration of an embodiment of a password authenticating apparatus according to the present disclosure.

As illustrated in FIG. 1, the password authenticating apparatus 1 of the present embodiment is an apparatus that receives input of a login name and password by a user and performs user authentication based on the inputted login name and password. Referring to FIG. 1, the password authenticating apparatus 1 includes a display unit 10, an input unit 20, a storage unit 30, and a control unit 40. Hereinafter, the login name and password inputted from the input unit 20 are referred to as an input login name and an input password, respectively.

The display unit 10 and the input unit 20 can be configured with a touch panel provided with a transparent pressure sensitive sensor on the surface of a display panel such as liquid crystal or the like. In this case, the display panel of the touch panel functions as the display unit 10 for displaying various operation keys, and login name and password input status. The pressure sensitive sensor of the touch panel functions as the input unit 20 that receives input of a login name and password and operations of various operation keys. Note that a keyboard may be provided as the input unit 20 for inputting the login name and password.

The storage unit 30 is a storage unit such as a semiconductor memory or the like. The storage unit 30 stores authentication information 31 and dummy information 32.

In the authentication information 31, the user's login name and password are correlated and registered. Hereinafter, the login name and password registered in the authentication information 31 will be referred to as a registered login name and a registered password, respectively.

In the dummy information 32, a login name that is not registered in the authentication information 31 and a randomly generated password are correlated and registered. Hereinafter, the login name and password registered in the dummy information 32 will be referred to as a dummy login name and a dummy password, respectively.

The control unit 40 is an arithmetic processing circuit such as a microcomputer or the like including a CPU (Central Processing Unit), a ROM (Read Only Memory), a RAM (Random Access Memory), and the like. The ROM stores a control program for performing operation control of the password authenticating apparatus 1. The CPU of the control unit 40 performs overall control of the apparatus by reading the control program stored in the ROM and developing the control program in the RAM. In addition, the control unit 40 functions as an input-receiving unit 41, a screen-generating unit 42, a display-control unit 43, a login-name-comparing unit 44, a password-header-comparing unit 45, an entire-password-comparing unit 46, and an authorizing unit 47.

The input-receiving unit 41 includes a register for temporarily storing the input login name and the input password inputted from the input unit 20. In addition, the input-receiving unit 41 notifies the login-name-comparing unit 44 of the completion of input of the input login name. Furthermore, the input-receiving unit 41 notifies the password-header-comparing unit 45 that the input password has reached a preset number of header comparison characters. In the present embodiment, the number of header comparison characters is set to three characters. Furthermore, the input-receiving unit 41 notifies the entire-password-comparing unit 46 of the completion of input of the input password.

Figure 2:
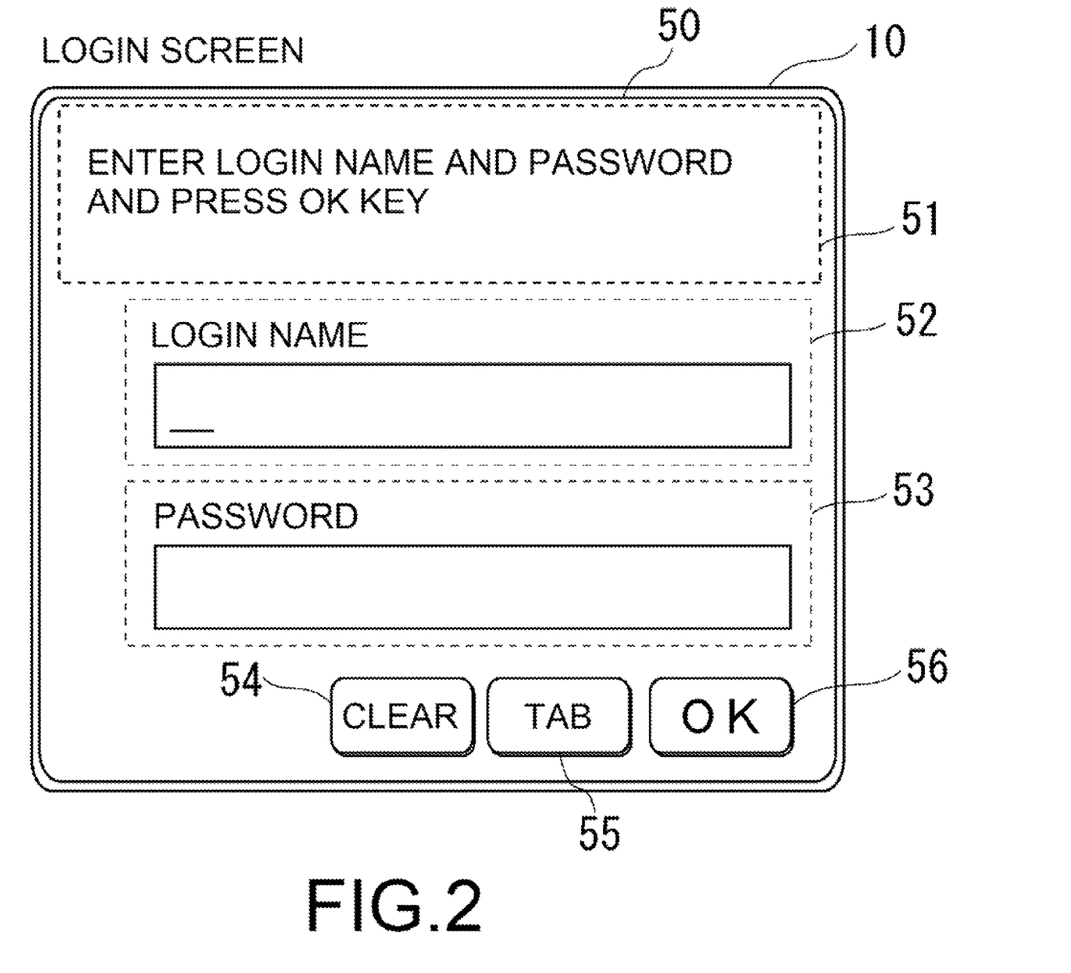
FIG. 2 is a diagram illustrating an example of a login screen displayed on the display unit illustrated in FIG. 1.
Figure 3A:
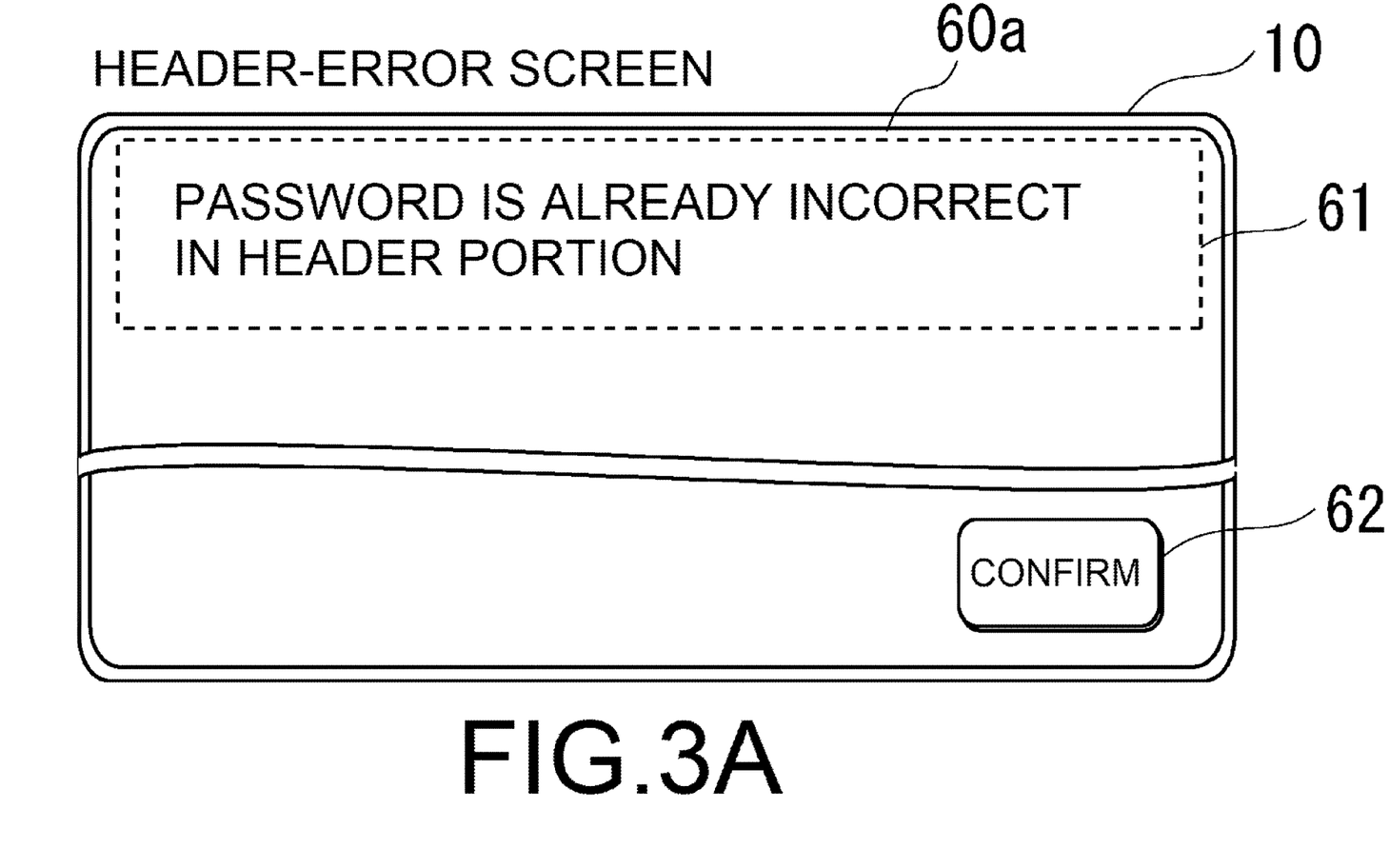
FIG. 3A is a diagram illustrating an example of an error screen displayed on the display unit illustrated in FIG. 1.
Figure 3B:
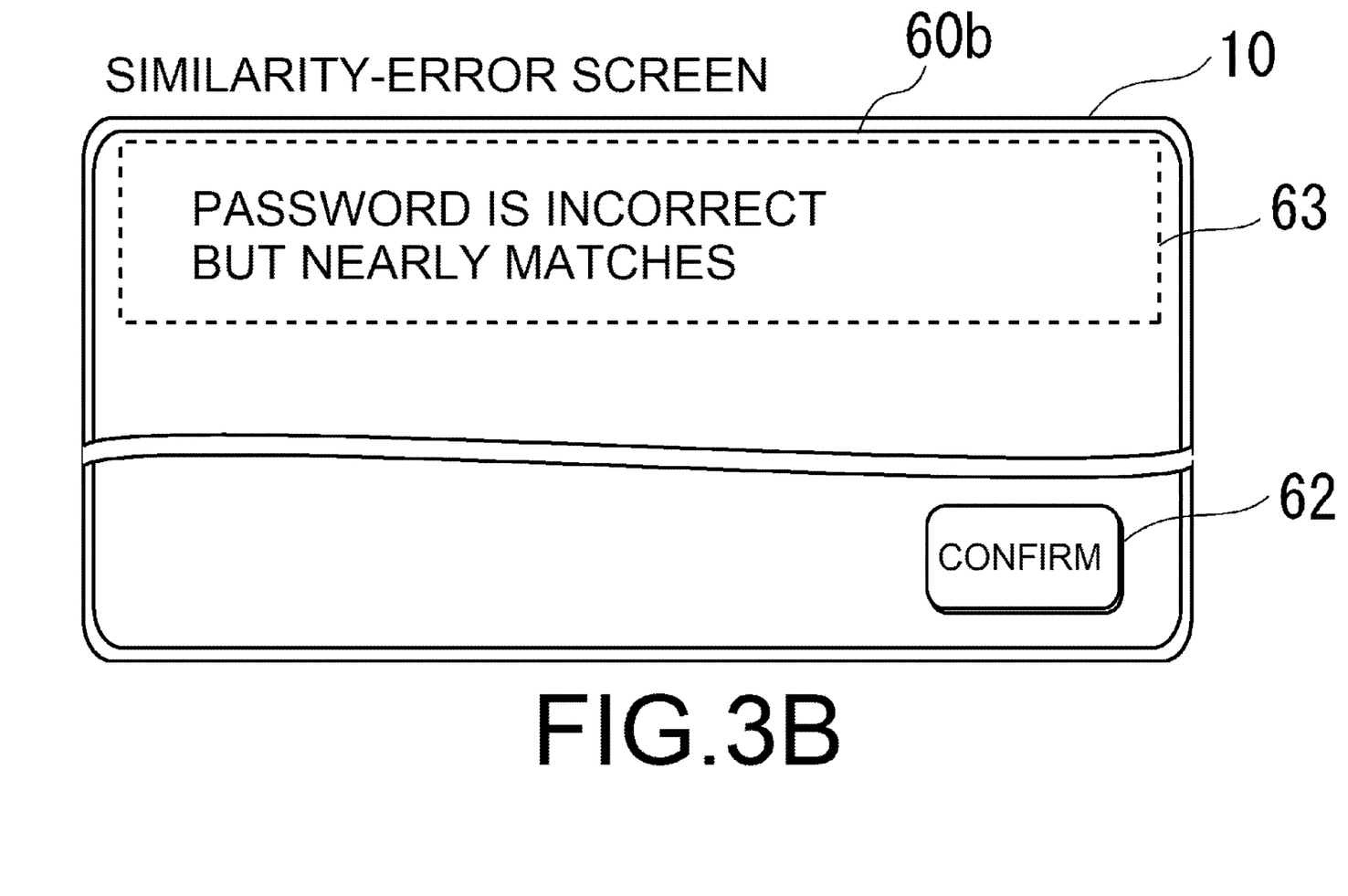
FIG. 3B is a diagram illustrating an example of an error screen displayed on the display unit illustrated in FIG. 1.
Figure 3C:
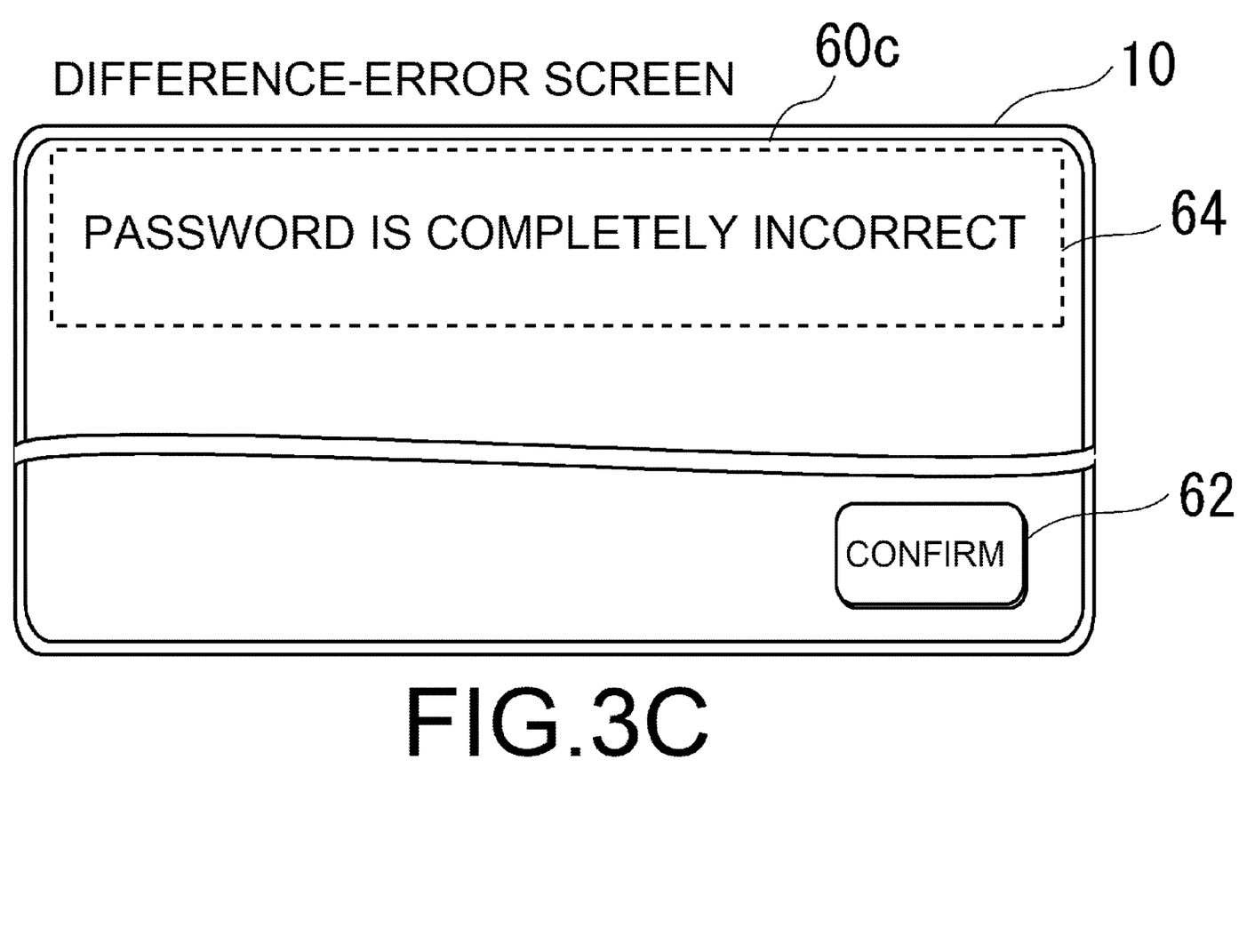
FIG. 3C is a diagram illustrating an example of an error screen displayed on the display unit illustrated in FIG. 1.

The screen-generating unit 42 generates a login screen 50 as illustrated in FIG. 2, and a header-error screen 60a, a similarity-error screen 60b and a difference-error screen 60c as illustrated in FIGS. 3A to 3C.

The login screen 50 is a screen for receiving input of a login name and a password. As illustrated in FIG. 2, an input guidance message 51 for guiding the input of a login name and a password, a login name input field 52, a password input field 53, a clear key 54, a tab key 55, and an OK key 56 are arranged on the login screen 50. Incidentally, the clear key 54 is an operation key for deleting the input in the login name input field 52 and the password input field 53; the tab key 55 is an operation key for moving between the input fields; the OK key 56 is an operation key for confirming the input in the login name input field 52 and in the password input field 53.

As illustrated in FIG. 3A, a header error message 61 for providing guidance that the password is already incorrect in the header portion, or in other words, that in the header portion the input password and the registered password already do not match, and a confirmation key 62 are arranged on the header-error screen 60a.

As illustrated in FIG. 3B, a similarity error message 63 that provides guidance that the password is incorrect but nearly matches, or in other words, that the input password and the registered password do not match but are rather close, and a confirmation key 62 are arranged on the similarity-error screen 60b.

As illustrated in FIG. 3C, a difference error message 64 that provides guidance that the password is very incorrect, or in other words, that the input password and the registered password are very different, and a confirmation key 62 are arranged on the difference-error screen 60c.

The display control unit 43 displays the login screen 50, the header-error screen 60a, the similarity-error screen 60b, and the difference-error screen 60c generated by the screen-generating unit 42 on the display unit 10.

The login-name-comparing unit 44 compares the input login name with the authentication information 31 and determines whether or not the input login name is registered as the registered login name in the authentication information 31.

The password-header-comparing unit 45 compares a header portion of the input password up to the number of header comparison characters (for example, three characters) with the authentication information 31, and determines whether or not the header portion of the input password up to the number of header comparison characters matches or nearly matches a portion from the start of the registered password up to the number of header comparison characters.

The entire-password-comparing unit 46 compares the input password after input is completed with the authentication information 31 and determines whether or not the input password matches the registered password.

The authorizing unit 47 executes a login process when notified of a match of the input password from the entire-password-comparing unit 46.

Figure 4:
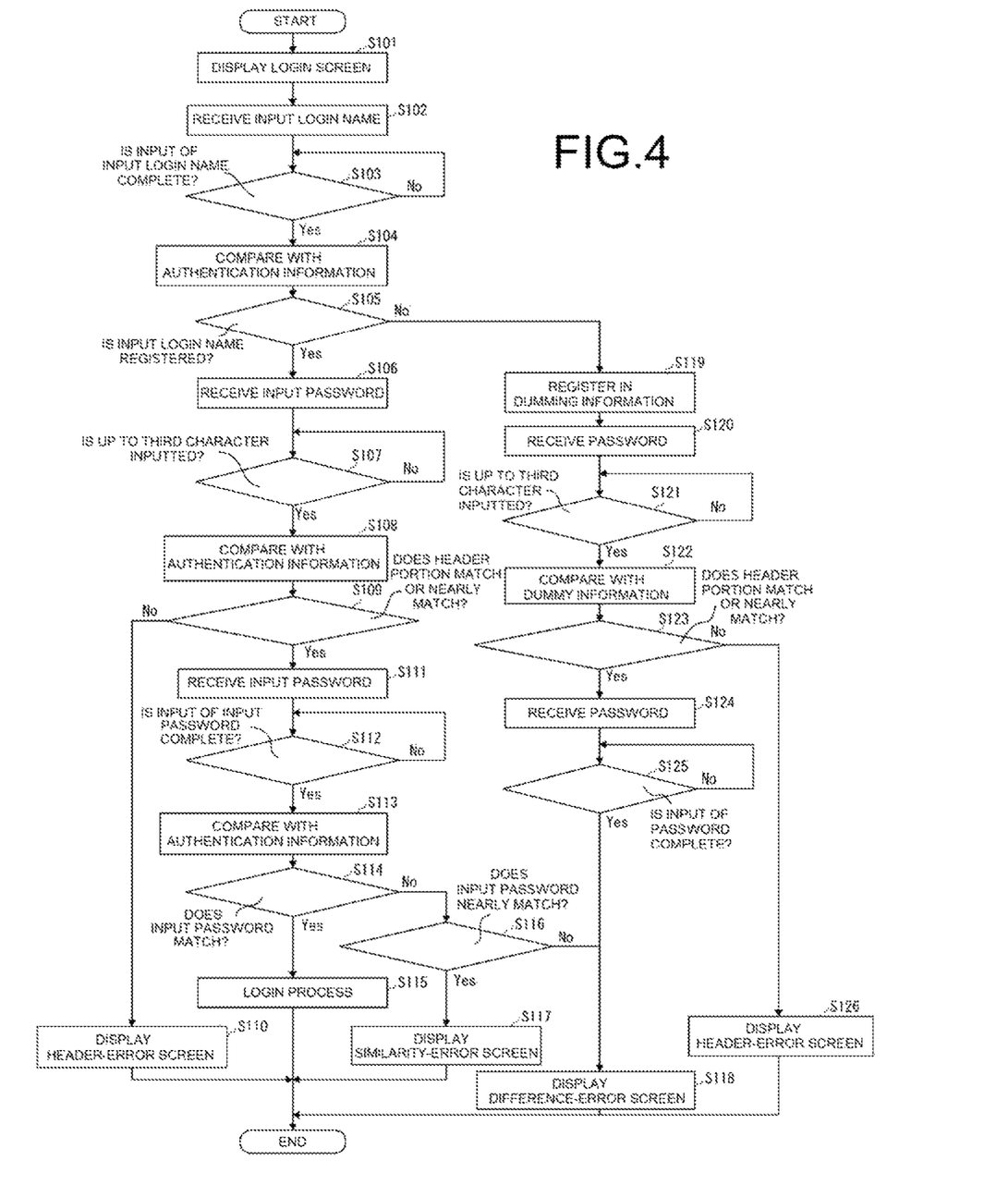
FIG. 4 is a flowchart illustrating an authentication operation according to an embodiment of the password authenticating apparatus according to the present disclosure.

Next, the authentication operation by the password authenticating apparatus 1 will be described in detail with reference to FIG. 4.

During user authentication using a password, the display-control unit 43 causes the display unit 10 to display the login screen 50 generated by the screen-generating unit 42 (step S101).

Next, the input-receiving unit 41 receives the input of the input login name in the login name input field 52 (step S102), and monitors completion of input of the input login name (step S103).

When the input field is switched from the login name input field 52 to the password input field 53 by operation of the tab key 55, the input-receiving unit 41 determines that input of the input login name is completed in the step S103, and notifies the login-name-comparing unit 44 of the completion of input of the input login name.

The login-name-comparing unit 44 that has been notified of the completion of input of the input login name compares the input login name with the authentication information 31 (step S104), and determines whether or not the input login name is registered as the registered login name in the authentication information 31 (step S105).

When the input login name is registered in the authentication information 31 in step S105, the input-receiving unit 41 receives input of the input password in the password input filed 53 (step S106), and determines whether or not the input of the input password has reached the number of header comparison characters (step S107).

In the case where the input of the input password has reached the number of header comparison characters in step S107, the input-receiving unit 41 instructs the password-header-comparing unit 45 to make a comparison with the authentication information 31.

The password-header-comparing unit 45 that is instructed to make a comparison with the authentication information 31 compares the header portion of the input password up to the number of header comparison characters with the authentication information 31 (step S108). Then, the password-header-comparing unit 45 determines whether or not the header portion of the input password up to the number of header comparison characters matches or nearly matches the portion from the start of the registered password up to the number of header comparison characters (step S109).

In the case where the result of deleting one character from the number of header comparison characters of the header portion of the input password matches the result of deleting one character from the portion from the start of the registered password up to the number of header comparison characters, the password-header-comparing unit 45 determines in step S109 that the passwords nearly match. For example, in the case where the number of header comparison characters is three characters, in addition to the case where the first two characters completely match (input password: ab, registered password: ab), in the following cases, it is determined that the passwords nearly match. The passwords nearly match in the case where the first character and the third character match (input password: axc, registered password: abc), in the case where the second character and the third character match (input password: xbc, registered password: abc), in the case where there is a match by deleting the first character of the input password (input password: xab, registered password: ab), in the case where there is a match by deleting the second character of the input password (input password: axb, registered password: abc), in the case where there is a match by deleting the first character of the registered password (input password: bc, registered password: abc), and in the case where there is a match by deleting the second character of the registered password (input password: ac, registered password: abc).

In Step S109, in the case where the passwords do not match or do not nearly match, the password-header-comparing unit 45 instructs the screen-generating unit 42 to generate a header-error screen 60*a*. The display-control unit 43 causes the display unit 10 to display the header-error screen 60*a* generated by the screen-generating unit 42 (step S110) and terminates the authentication operation. Incidentally, by operating the confirmation key 62 on the header-error screen 60*a*, the comparison operation is started again and the process returns to step S101.

By the header error message 61 on the header-error screen 60*a*, the user is provided with guidance that the input password and the registered password already do not match in the header portion. As a result, by simply inputting the number of header comparison characters and recognizing that the presumed input password is totally different, the user can try logging in with a different input password, so it is possible to prevent the user from spending extra time and labor.

It should be noted that, in step S109, it is possible to only determine whether or not there is a match, however in that case, even when the presumed input password is correct, when a simple mistake is made at the beginning of the input password, the header-error screen 60*a* is displayed. As a result, the user recognizes that the presumed input password is completely different, and attempts to log in with a different input password, which takes extra labor and time. Therefore, presuming that there is also a simple typing mistake at the beginning of the input password, in the case where there is a near match in step S109, the header-error screen 60*a* is not displayed.

In the case where the passwords match or nearly match in step S109, the input-receiving unit 41 receives the continuing input of the input password in the password input field 53 (step S111), and monitors the completion of the input of the input password (step S112).

As a result of operating the OK key 56, the input-receiving unit 41 determines that input of the input password is completed in step S112, and instructs the entire-password-comparing unit 46 to make a comparison with the authentication information 31.

The entire-password-comparing unit 46 that is instructed to make a comparison with the authentication information 31 compares the input password that has been completely inputted with the authentication information 31 (step S113) and determines whether or not the input password matches the registered password (step S114).

In the case where the input password matches the registered password in step S114, the entire-password-comparing unit 46 notifies the authorizing unit 47 of the matching input password. Then, the authorizing unit 47 that is notified of the matching input password executes a login process (step S115) and ends the authentication operation.

In the case where the input password and the registered password do not match in step S114, the entire-password-comparing unit 46 determines whether or not the input password and the registered password nearly match (step S116).

The determination by the entire-password-comparing unit 46 as to whether or not the passwords nearly match can be made by simply comparing the input password and the registered password with each other on the same digits, and a near match can be determined in the case where the number of matches or the matching rate of both is equal to or greater than a preset threshold value. In addition, it is also possible to find the difference by calculating the longest common subsequence of the input password and the registered password, and determine a near match in the case where the shortest edited script is less than a preset threshold value. According to the latter method using the longest common subsequence, even when input of a character is missing or when a character which is originally a single character is typed twice, a near match can be determined when the input after that matches.

In the case where the input password and the registered password nearly match in step S116, the entire-password-comparing unit 46 instructs the screen-generating unit 42 to generate a similarity-error screen 60*b*. The display-control unit 43 causes the display unit 10 to display the similarity-error screen 60*b* generated by the screen-generating unit 42 (step S117), and ends the authentication operation. Incidentally, by operating the confirmation key 62 on the similarity error screen 60*b*, the comparison operation is started again and the process returns to step S101.

Guidance is provided to the user by the similarity error message 63 on the similarity-error screen 60*b* that the input password and the registered password do not match but are considerably close. As a result, the user can grasp that the presumed input password is correct, and it is highly possible that the login failed due to just a typing mistake.

Note that there is a method of displaying on the similarity-error screen 60*b* which digit of the input password is incorrect. In this way, in the case where the correct password is known, the password is inputted being careful of the incorrect digit. On the other hand, an attacker does not know whether the mistake is a character difference, or a missing or excessive character (in the case when the method of determination is longest common subsequence), so security is relatively high.

In the case where the input password and the registered password do not nearly match in step S116, the entire-password-comparing unit 46 instructs the screen-generating unit 42 to generate a difference-error screen 60c. The display-control unit 43 causes the display unit 10 to display the difference-error screen 60c generated by the screen-generating unit 42 (step S118) and terminates the authentication operation. Incidentally, by operating the confirmation key 62 on the difference-error screen 60c, the comparison operation is started again and the process returns to step S101.

Guidance is provided to the user by the difference error message 64 on the difference error screen 60c that the input password and the registration password do not match at all. As a result, the user can recognize that the presumed input password is completely incorrect and can try login with a different input password, so it is possible to prevent the user from spending unnecessary labor and time.

A case in which the input login name is not registered in the authentication information 31 in step S105 will be described. In this case, the login-name-comparing unit 44 registers the input login name received in step S102 as a dummy login name in the dummy information 32. At the same time, a randomly generated character string of a number of header comparison characters is correlated as a dummy password with a dummy login name and registered (step S119).

Next, the input-receiving unit 41 receives input of the input password in the password input field 53 (step S120) and determines whether or not the input of the input password has reached the number of header comparison characters (step S121).

When the input of the input password reaches the number of header comparison characters in step S121, the input-receiving unit 41 instructs the password-header-comparing unit 45 to make a comparison with the dummy information 32.

The password-header-comparing unit 45 that is instructed to make a comparison with the dummy information 32 compares a header portion of the input password up to the number of header comparison characters with the dummy information 32 (step S122). Then, the password-header-comparing unit 45 determines whether or not the header portion of the input password up to the number of header comparison characters matches or nearly matches the dummy password (step S123).

In the case where the passwords do not match or nearly match in step S123, the password-header-comparing unit 45 instructs the screen-generating unit 42 to generate the header-error screen 60a. The display-control unit 43 causes the display unit 10 to display the header-error screen 60a generated by the screen-generating unit 42 (step S126), and terminates the authentication operation.

In the case where the passwords match or nearly match in step S123, the input-receiving unit 41 receives continuing input of the input password in the password input field 53 (step S124) and monitors completion of input of the input password (step S125).

By operating the OK key 56, the input-receiving unit 41 determines in step S125 that the input of the input password is completed, and instructs the screen-generating unit 42 to generate a difference-error screen 60c. The display-control unit 43 causes the display unit 10 to display the difference-error screen 60c generated by the screen-generating unit 42 (step S118) and terminates the authentication operation.

Note that, according to the present embodiment, password information is partially given to a third party, however the strength of the password can be increased by increasing the bit length. When setting a password, this can be dealt with by setting a longer password in advance. It is good to increase the recommended (or forced) length on a password setting screen or the like.

In the case where an 80% match is determined to be "nearly matching", the password should be set so that 80% of the length is equal to the length of a conventional password. Furthermore, since the number of header comparison characters may be known by attacks, the password length is increased by the number of header comparison characters. In the case where the conventional recommended password length is 8 characters, the password length is extended to 10 characters so that the 8 characters are 80% the length. Furthermore, since the number of header comparison characters is increased (for example, three characters), it is advisable to further extend the password length to 13 characters.

Moreover, in the present embodiment, as compared with a typical technique in which part of the password is displayed as a hint, no special operation for displaying the hint is required. In addition, by increasing the hint (for example, from 1 to 2 characters), the security decreases, however, by increasing the number of header comparison characters to be inspected in this disclosure, safety will rather increase, but after the 3rd character, the effect of knowing what should be input increases like in the case of increasing the hint.

As described above, according to this embodiment, a password authenticating apparatus 1 that executes user authentication using a password includes: a storage unit 30 that stores authentication information 31 in which a password is registered as a registered password; an input-receiving unit 41 that receives input of a password as an input password; a password-header-comparing unit 45, that when input of a preset number of header comparison characters is received by the input-receiving unit 41, compares a header portion of the input password up to the number of header comparison characters with authentication information 31, and determines whether or not the header portion of the input password up to the number of header comparison characters matches a portion from the start of the registered password up to the number of header comparison characters; a screen-generating unit 42 that, in the case where the password-header-comparing unit 45 determines that there is no match, generates a header-error screen 60a that provides guidance that the header portion of the input password is already incorrect as a display screen; and a display-control unit 43 that causes a display unit 10 to display the display screen that is generated by the screen-generating unit 42; wherein the input-receiving unit 41, in the case where the password-header-comparing unit 45 determines there is a match, receives continuing input of the input password.

With this configuration, it is possible to give a hint for password selection without displaying part of the password, and the user can recognize by inputting just the number of header comparison characters that the presumed input password is totally different and can try logging in with a different input password, so it is possible to prevent the user from spending extra labor and time.

Furthermore, in this embodiment, the password-header-comparing unit 45 determines whether or not the header portion of the input password up to the number of header comparison characters nearly matches the portion from the start of the registered password up to the number of header comparison characters; the screen-generating unit 42, in the case where the password-header-comparing unit 45 determines that there is no match or no near match, generates a header-error screen 60*a* as a display screen; and the input-receiving unit 41, in the case where the password-header-comparing unit 45 determines there is a match or near match, receives continuing input of the input password.

With this configuration, it is possible to prevent the header-error screen 60*a* from being displayed due to a simple typing mistake at the beginning of the password, and it is possible to prevent erroneously recognizing that the input password presumed by the user is completely different.

Furthermore, in the present embodiment, the password-header-comparing unit 45 determines that there is a near match in the case where the result of deleting one character from the portion of the input password up to the number of header comparison characters matches the result of deleting one character from the portion from the start of the registered password up to the number of header comparison characters.

With this configuration it is possible to determine there is a near match in the case of a simple typing mistake.

Furthermore, in this embodiment, a login name is correlated with a registered password and registered in the authentication information 31 as a registered login name; the input-receiving unit 41 receives input of the login name as an input login name, the password authenticating apparatus further includes a login-name-comparing unit 44 that compares the input login name with the authentication information 31, and determines whether or not the input login name is registered in the authentication information 31 as the registered login name; and in the case where the input login name is not registered in the authentication information 31 as the registered login name, takes the input login name to be a dummy login name, and generates dummy information 32 in which a character string having a number of characters equal to the number of header comparison characters is randomly generated as a dummy password and correlated with the dummy login name; and in the case where the input login name is not registered in the authentication information 31 as the registered login name, and when the input-receiving unit 41 receives input of a preset number of header comparison characters, the password-header-comparing unit 45 compares the header portion of the input password up to the number of header comparison characters with the dummy information 32 and determines whether or not the header portion of the input password up to the number of header comparison characters matches the dummy password.

With this configuration, it is not easily known whether or not the input login name is incorrect. In other words, in the case where the login name is incorrect, when the header-error screen 60*a* is displayed with the number of header comparison characters for all the inputs, it is determined relatively early that the login name is invalid. Therefore, in the this embodiment, in the case where the login name is not registered, a dummy password having a number of characters equal to the number of header comparison characters is generated, and when a dummy password is inputted, the continuing input of the input password is received.

Furthermore, according to this embodiment, a password authenticating apparatus 1 that executes user authentication using a password includes: a storage unit 30 that stores authentication information 31 in which a password is registered as a registered password; an input-receiving unit 41 that receives input of a password as an input password; an entire-password-comparing unit 46 that, after receiving the input of the input password by the input-receiving unit 41 is completed, compares the input password with the authentication information 31, and together with determining whether or not the input password matches the registered password, determines whether or not the input password nearly matches the registered password; an authorizing unit 47 that, in the case where the entire-password-comparing unit determines that there is a match, executes a login process; a screen-generating unit 42 that, in the case where the entire-password-comparing unit 46 determines that there is a near match, generates a similarity-error screen 60*b* providing guidance that the input password and the registered password do not match but are rather close as a display screen, and in the case where the entire-password-comparing unit 46 determines that there is no near match, generates a difference-error screen 60*c* providing guidance that the input password and the registered password do not match at all as a display screen; and a display-control unit 43 that causes the display unit 10 to display the display screen generated by the screen-generating unit 42.

With this configuration, the user is provided with guidance that the input password and the registered password do not match, but are rather close, and the user is able to grasp that the presumed input password is correct, and that it is highly possible that login is not possible due to a simple typing mistake.

Furthermore, in this embodiment, the entire-password-comparing unit 46 calculates a longest common partial sequence of the input password and the registered password to obtain a difference, and in the case where a shortest editing script is less than a preset threshold, determines there is a near match.

With this configuration, even when the input of a character is missing or a character that originally is a single character is typed twice, a near match can be determined when the subsequent inputs match.

In a configuration as in the typical technique described above in which a part of the password is displayed on the screen, there is a danger that another person can see the password and there is a problem that a user may experience psychological resistance.

According to the present disclosure, it is possible to give a hint of password selection without displaying a part of the password.

It should be noted that the technique according to the present disclosure is not limited to the above-described embodiments, and it is apparent that each embodiment can be appropriately modified within the scope of the technical idea of the present disclosure. Moreover, the number, the position, the shape, and the like of the above-described constituent members are not limited to those in the above-described embodiments, and may be a number, a position, a shape, and the like that are suitable for implementing the technique according to the present disclosure. Incidentally, in each figure, the same reference numbers are given to the same constituent elements.

What is claimed is:

1. A password authenticating apparatus that executes user authentication using a password, comprising:
   a storage unit that stores authentication information in which a password is registered as a registered password;
   an input-receiving unit that receives input of a password as an input password;
   a password-header-comparing unit that, when input of a preset number of header comparison characters is received by the input-receiving unit, compares a header portion of the input password up to the number of header comparison characters with authentication information, and determines whether or not the header portion of the input password up to the number of header comparison characters matches a portion from the start of the registered password up to the number of header comparison characters;

a screen-generating unit that, in the case where the password-header-comparing unit determines that there is no match, generates a header-error screen that provides guidance that the header portion of the input password is already incorrect as a display screen; and a display-control unit that causes a display unit to display the display screen that is generated by the screen-generating unit; wherein the input-receiving unit, in the case where the password-header-comparing unit determines there is a match, receives continuing input of the input password.

2. The password authenticating apparatus according to claim 1, wherein the password-header-comparing unit determines whether or not the header portion of the input password up to the number of header comparison characters nearly matches the portion from the start of the registered password up to the number of header comparison characters based on whether a determined matching rate or number of matched digits is equal to or greater than a threshold or based on whether a shortest edited script from a determined difference is less than a threshold;

the screen-generating unit, in the case where the password-header-comparing unit determines that there is no match or no near match, generates a header-error screen as a display screen; and the input-receiving unit, in the case where the password-header-comparing unit determines there is a match or near match, receives continuing input of the input password.

3. The password authenticating apparatus according to claim 2, wherein the password-header-comparing unit, in the case where the result of deleting one character from the header portion of the input password up to the number of header comparison characters matches the result of deleting one character from the portion from the start of the registered password up to the number of header comparison characters, determines that there is a near match.

4. The password authenticating apparatus according to claim 1, wherein a login name is correlated with a registered password and registered in the authentication information as a registered login name;

the input-receiving unit receives input of the login name as an input login name;

the password authenticating apparatus further comprises a login-name-comparing unit that compares the input login name with the authentication information, and determines whether or not the input login name is registered in the authentication information as the registered login name; and in the case where the input login name is not registered in the authentication information as the registered login name, takes the input login name to be a dummy login name, and generates dummy information in which a character string having a number of characters equal to the number of header comparison characters is randomly generated as a dummy password and correlated with the dummy login name; and in the case where the input login name is not registered in the authentication information as the registered login name, and when the input-receiving unit receives input of a preset number of header comparison characters, the password-header-comparing unit compares the header portion of the input password up to the number of header comparison characters with the dummy information and determines whether or not the portion of the input password up to the number of header comparison characters matches the dummy password.

5. A password authenticating apparatus that executes user authentication using a password, comprising:

a storage unit that stores authentication information in which a password is registered as a registered password;

an input-receiving unit that receives input of a password as an input password;

an entire-password-comparing unit that, after receiving the input of the input password by the input-receiving unit is completed, compares the input password with the authentication information, and together with determining whether or not the input password matches the registered password, determines whether or not the input password nearly matches the registered password based on whether a determined matching rate or number of matched digits is equal to or greater than a threshold or based on whether a shortest edited script from a determined difference is less than a threshold;

an authorizing unit that, in the case where the entire-password-comparing unit determines that there is a match, executes a login process;

a screen-generating unit that, in the case where the entire-password-comparing unit determines that there is a near match, generates a similarity-error screen providing guidance that the input password and the registered password do not match but are rather close as a display screen, and in the case where the entire-password-comparing unit determines that there is no near match, generates a difference-error screen providing guidance that the input password and the registered password do not match at all as a display screen; and a display-control unit that causes a display unit to display the display screen generated by the screen-generating unit.

6. The password authenticating apparatus according to claim 5, wherein the entire-password-comparing unit calculates a longest common partial sequence of the input password and the registered password to obtain a difference, and in the case where a shortest editing script is less than a preset threshold, determines there is a near match.

7. The password authenticating apparatus according to claim 5, comprising a password-header-comparing unit that, when the input-receiving unit receives input of a preset number of header comparison characters, compares a header portion of the input password up to the number of header comparison characters with the authentication information, and determines whether or not the header portion of the input password up to the number of header comparison characters matches or nearly matches a portion from the start of the registered password up to the number of header comparison characters based on whether a determined matching rate or number of matched digits is equal to or greater than a threshold or based on whether a shortest edited script from a determined difference is less than a threshold; wherein the screen-generating unit, in the case where the password-header-comparing unit determines that there is no match or near match, generates a header-error screen providing guidance that the input password is already incorrect in the header portion as the display screen; and the input-receiving unit, in the case where the password-header-comparing unit determines that there is a match, receives continuing input of the input password.

8. The password authenticating apparatus according to claim 7, wherein the password-header-comparing unit, in the case where the result obtained by deleting one character from the header portion of the input password up to the number of header comparison characters.

\* \* \* \* \*